Nov. 27, 1962
W. C. DIEHL
3,065,952
PLUG VALVE HAVING WEDGE CAMMING MEANS
Filed Dec. 2, 1960
2 Sheets-Sheet 1
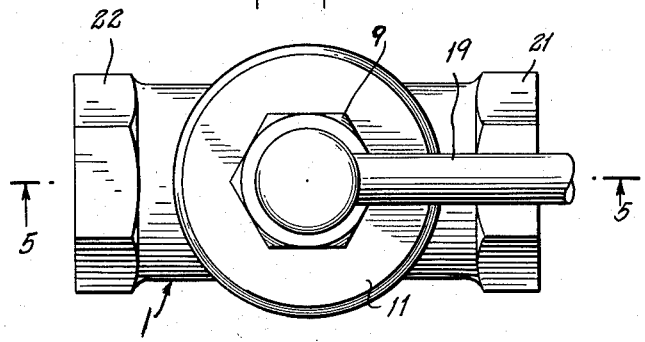
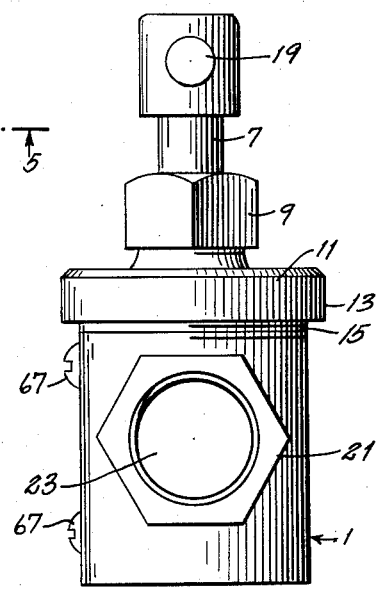
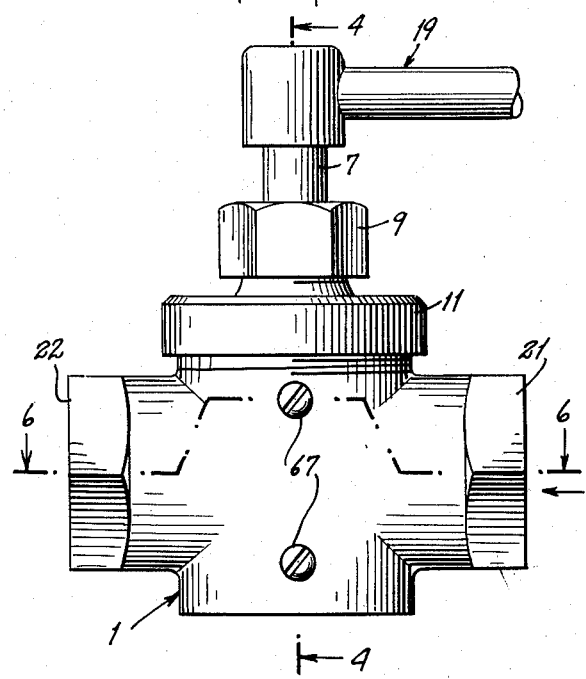
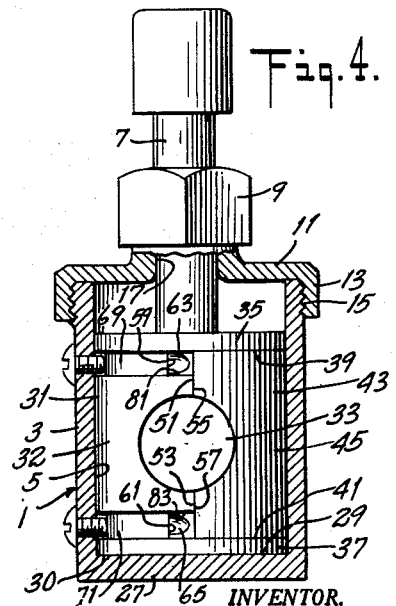
INVENTOR.
WILLIAM C. DIEHL
BY Paul M. Phillips
ATTORNEY Nov. 27, 1962 W. C. DIEHL 3,065,952
PLUG VALVE HAVING WEDGE CAMMING MEANS
Filed Dec. 2, 1960 2 Sheets-Sheet 2
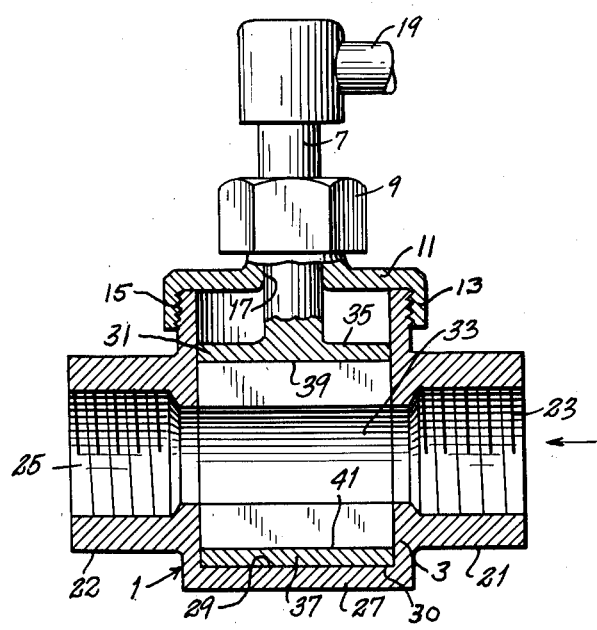
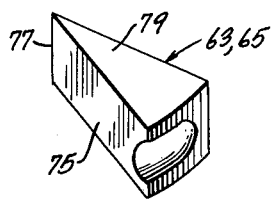
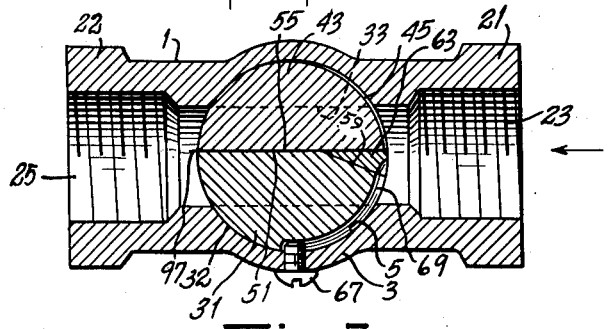
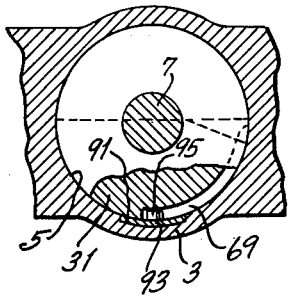
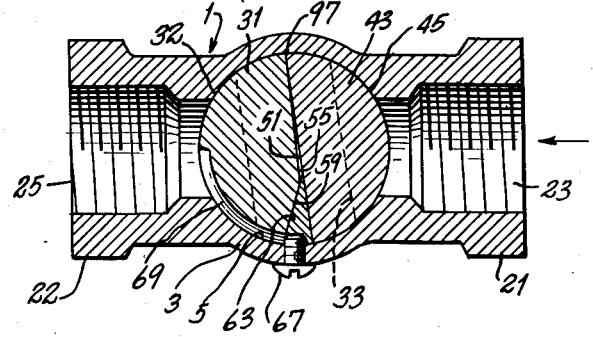
INVENTOR.
WILLIAM C. DIEHL
BY Paul M. Phillips
ATTORNEY

United States Patent Office 3,065,952
Patented Nov. 27, 1962

1

3,065,952
PLUG VALVE HAVING WEDGE
CAMMING MEANS
William C. Diehl, 7604 Park Ave., North Bergen, N.J.
Filed Dec. 2, 1960, Ser. No. 73,247
10 Claims. (Cl. 251—192)

This invention relates to valves and more especially to valves of the type known as plug valves having a rotatable member or plug in seating relation to a seating surface formed in the body of the valve. The invention more particularly relates to a plug valve having means for effecting and maintaining the seating engagement of the plug with the seating surface of the valve body in the closed position of the valve.

Valves of this type have been proposed heretofore in which the rotatable structure comprises two parts which are movable relative to each other transversely of the axis of rotation against a seating surface of the valve body. This seating surface ordinarily is conical or cylindrical and the transverse movement of the parts has been effected in some cases by camming or wedging action, the wedge moving generally parallel to the axis. In other cases the transverse movement is accomplished by means of mutually engaging arcuate surfaces that are eccentric to the axis of rotation.

Such structures are complicated and have a relatively large number of cooperating parts requiring in the manufacture of the valve a large amount of machining for proper fit. Moreover, due to wear and articulation of a large number of parts, the function of seating for improving the sealing or tightness of the valve in the closed position is not efficiently maintained.

It is an object of the invention to provide a valve having a rotatable valve member in seating relation to a seating surface of the valve body and utilizing a small number of parts.

It is another object of the invention to provide an improved kinematic action for accomplishing the effective seating of the rotatable valve member on the seating surface of the valve body.

It is an additional object of the invention to provide for effecting efficient seating and release movement of a part of the rotatable structure with respect to the seating surface of the valve body in the rotation of the rotatable structure.

It is a further object of the invention to provide simple means for directly pressing a part of the rotatable structure upon the seating surface of the valve body in the position of the rotatable structure in which the valve is closed.

It is a still further object of the invention to provide for easily taking up the wear on the mutually engaging surfaces which occurs in the operation of the valve.

It is a feature of the invention that the rotatable structure or the rotatable valve member of the valve comprises two parts supported for movement of one relative to the other transversely of the axis of rotation of the valve member to bring one or both of these parts into seating engagement with the seating surface of the valve body, preferably a surface of revolution to which the peripheral surface of the parts may conform. This valve member provides a flow passage therethrough extending between an inlet and an outlet of the flow passage transversely of the axis of rotation, the inlet and outlet of the flow passage being disposed respectively adjacent and communicating with the inlet opening and outlet opening of the valve body when the valve member is in a given angular relation to the valve body about the axis. When the valve member is rotated from the given angular relation to the valve body to another angular relation thereof to the body

2 about the axis, flow between the inlet opening and outlet opening of the valve member is closed off. In this latter position the two parts of the valve member that are supported for movement of one relative to the other transversely of the axis may be moved transversely of the flow passage of the valve member to effect engagement of at least one of these parts with the seating surface formed in the valve body.

To effect this transverse movement of one part of the valve member relative to the other, a cam element is supported in the valve for movement relative to and in engagement with both of these parts. Surfaces are provided on the two parts and on the cam element such that the camming action effects separating movement of the two parts to produce the engagement of the peripheral surface of the rotatable member with the seating surface of the valve body. One of the parts of the rotatable structure may be rigidly carried by a stem or shaft which is supported for rotation in bearing relation to the valve body or to a bonnet carried by the valve body, or to both. Preferably the part of the rotatable structure which is thus rigidly secured to the stem provides a surface of revolution, ordinarily cylindrical, which is in bearing relation to a corresponding surface of revolution or a cylindrical surface formed in the valve body.

The peripheral surface of the other part also may be a surface of revolution, which may be cylindrical, conforming to the surface of revolution of the valve body when this other part is moved against the seating surface in the separating movement of the two parts of the rotatable valve member. The surfaces of revolution ordinarily are concentric with the axis of the stem or shaft, this axis constituting the axis of rotation of the rotatable structure of the valve.

The cam element may have the form of a wedge disposed with the edge of the wedge which is defined by the intersection of the cam surfaces thereof disposed toward the axis of rotation with respect to the peripheral surface of the rotatable valve member. These cam surfaces of the wedge may engage corresponding cam follower surfaces formed respectively on the two parts of the rotatable valve member so that inward movement of the cam element toward the axis of rotation effects the separation of the two parts of the valve member. When a given one of the parts of the valve member is rigidly carried by a stem or shaft, as above mentioned, the other part is moved away from the given part by the inward movement of the cam element to bring the peripheral surface of the other part into engagement with the seating surface of the valve body.

The cam follower surfaces, therefore, extend in the direction from the periphery of the rotatable valve member inwardly toward the axis. One or both of them may extend in planes that are disposed substantially so as to contain the axis and they extend also generally along the extent of the flow passage of the rotatable valve member. As will be understood from further description in connection with the drawing, the cam element may be supported in a recess formed in one of the two parts of the rotatable member, or this cam element may be supported in recesses respectively formed in the two parts, to confine the cam element for the movement thereof generally toward and away from the axis of rotation.

The organization of the two parts of the rotatable valve member and the cam element provides a simple means for effecting the movement of at least one of the parts of the valve member into engagement with a seating surface of the valve body. Preferably the camming surfaces of the cam element are planar and correspondingly the cam follower surfaces on the two parts of the rotatable valve member are planar. A given one of these cam follower surfaces may be a continuous surface extending across the rotatable valve member and generally in a plane adjacent the axis of the flow passage, the other cam follower surface on the other part being disposed at an angle to a surface on this other part which extends across this other part of the valve member along the axis of the flow passage and is disposed adjacent and generally parallel to the continuous surface of the given member. The provision of surfaces of revolution, particularly cylindrical surfaces, for the seating surface of the valve body and the corresponding surfaces of the rotatable valve member and the provision of planar surfaces for the cam element and the cam follower surfaces make it possible to manufacture the valve of the invention with simple conventional machining operations at a relatively low cost while also providing for the requisite tight seal upon engagement of the rotatable valve member part with the seating surface of the body. The tight sealing is accomplished, moreover, without great resistance due to friction in the opening and closing movements of the valve.

To effect the inward movement of the cam elements toward the axis, as described, a cam element engaging member is provided which is supported by the valve body, this member being brought into engagement with the outer end portion of the cam element as the rotatable valve member approaches the position in which the valve is to be closed with one of the parts thereof brought into seating engagement with the seating surface of the valve body. This cam element engaging member may be disposed for engagement with a peripheral camming surface provided on the cam element such that, as the valve member finishes its rotation to the closed position, the cam element engaging member in engagement with the peripheral camming surface of the cam element effects the inward movement of this cam element to produce the separating movement of the parts of the rotatable valve member as described. The cam element engaging member may be merely a pin or the like carried by the wall of the valve body or may have other forms as hereinafter disclosed.

Other objects and features of the invention will be understood from the following description taken in connection with the drawings in which:

FIG. 1 shows a top view and
FIG. 2 shows an elevation of a valve of the plug type which embodies the invention;
FIG. 3 is an end elevation of the valve viewed from the right in FIG. 2;
FIG. 4 is a section on line 4—4 of FIG. 2;
FIG. 5 is a section on line 5—5 of FIG. 1;
FIG. 6 is a section on line 6—6 of FIG. 2 showing the rotatable valve member in the open position;
FIG. 7 is a section on line 6—6 of FIG. 2 showing the rotatable valve member in the closed position with one of the two parts thereof separated from the other for seating engagement with the seating surface of the valve body;
FIG. 8 shows to enlarged scale the camming element in the form of a wedge;
FIG. 9 shows a section corresponding to that of FIG. 6 having a cam element engaging member of modified form;
FIG. 10 shows to somewhat enlarged scale the cam element engaging member of FIG. 9.

In the embodiment of the invention shown in the drawings the valve body 1 provides a generally cylindrical chamber defined by walls 3 the inner surface 5 of which is cylindrical and substantially coaxial with the axis of a rotatable stem 7 which passes through a stuffing box 9 which may be of conventional type having a gland and cover, this stuffing box being carried by a bonnet 11 having a cylindrical flange 13 internally threaded and engaging the threads 15 formed on the upper end of the wall 3 as shown in FIG. 4. The bonnet 11 also may provide a bearing surface 17 for the stem 7 which is concentric with the cylindrical surface 5 of the wall 3. To the upper end of the stem 7 may be secured a handle 19 of suitable type for effecting rotation of the stem. The valve body 1 may be provided with hexagon ends 21, 22 respectively about an inlet opening 23 and the outlet opening 25, the openings 23 and 25 being provided with internal threads, as shown in FIGS. 5, 6 and 7, for connecting the valve in a pipe line.

The valve body 1 is provided with a lower wall 27 which may be machined at the inner surface 29 thereof to receive the bearing of the lower face 30 of the rotatable valve member 31 having a cylindrical surface 32 in rotatable bearing engagement with the inner cylindrical surface 5 of the valve body. The surfaces 5 and 32 are concentric with the axis of the stem 7 and the rotatable valve member thus may be rotated to different positions to dispose the flow passage 33 formed in this rotatable valve member in different angularly related positions as shown, for example, in FIGS. 6 and 7. The rotatable valve member 31 also is provided with flanges or disc-like portions 35 and 37 providing planar surfaces 39 and 41 between which is disposed the other part 43 of the rotatable valve member that is moved, as about to be described, by the action of the camming element in separating movement with respect to the rotatable part 31 of the valve member. The part 43 is formed with an exterior peripheral surface 45 of cylindrical contour corresponding to the cylindrical surface 5 of the body 3 such that, as shown in FIG. 7, the part 43 may become disposed with its surface 45 in engagement with the seating surface of the valve body to close off the inlet passage 23. It will be understood, however, although the passage 23 is shown as an inlet passage in the embodiment being described, that the flow of the fluid through the valve may be reversed, the opening 25 becoming the inlet opening and the opening 23 becoming the outlet opening.

In order to effect the separating movement which has been generally described above, the part 43 of the rotatable valve member which is movable between the flanges 35, 37 is provided with upper and lower surfaces respectively in engagement with upper and lower surfaces respectively in engagement with the surfaces 39 and 41 of the flanges 35 and 37. These surfaces may be machined in the two parts for suitable sliding fit with respect to each other. The part 43 also is provided with surfaces 51, 53 which are coplanar and parallel to the axis of the stem 7 and parallel to the axis of the flow passage 33. These planar surfaces engage corresponding planar surfaces 55 and 57 that are formed on the part 31 of the rotatable valve member which is rigidly carried on the stem 7. Adjacent one end of the planar surfaces 55 and 57 the rotatable part 31 is provided with cam element receiving recesses and respectively having cam follower surfaces 59, 61 which may be machined in the part 31. Between the cam follower surfaces 59, 61 and the respective planar surfaces 51, 53 of the movable part 43 are disposed cam elements 63, 65 in the form of wedges in this embodiment and having planar surfaces respectively in engagement with the cam follower surfaces 59, 61, these cam elements 63 being disposed with the edge thereof defined by the intersection of the planar surfaces thereof disposed toward the axis of revolution.

The outer peripheral surfaces of the cam elements 63, 65 are formed as camming surfaces which are engageable with cam element engaging members 67 which in this embodiment are provided by screws threaded in the wall 3 of the body of the valve. The ends of these screws extend inwardly with respect to the inner cylindrical surface 5 of the valve body and into annular grooves 69, 71 formed in the rotatable part 31, these grooves extending circumferentially about the rotatable part 31 and being disposed in spaced relation to each other along the axis of rotation and generally in the planes of the cam elements 63, 65 transverse to the axis. It will be understood from a consideration of FIGS. 4, 6 and 7, as the stem 7 of the valve is rotated to rotate the part 31 of the rotatable valve member from the position shown in FIG. 6 to that of FIG. 7, that the cam elements 63, 65 are brought into engagement with the cam element engaging members or screws 67, so that the outer peripheral surface of the cam elements 63, 65 which constitute camming surfaces are effective for producing movement of the cam elements 63, 65 inwardly toward the axis of rotation of the valve member and along the surfaces 51, 53 and in sliding movement also along the cam follower surfaces 59, 61 which are formed at the recesses provided in the rotatable part 31. Thus the part 43 is moved outwardly with respect to the axis to bring its cylindrical surface 45 into engagement with the cylindrical surface 5 of the valve body as the seating surface to close off the flow in the position shown in FIG. 7. Pressure of the part 43 is maintained upon the seating surface as long as the cam elements 63, 65 are maintained in engagement with the screws 67. When, however, rotation is effected in the opposite direction, counterclockwise in FIGS. 6 and 7, of the parts 31 and 43 of the rotatable valve member, this pressure is relieved and the cam elements 63, 65 may move outwardly along the planar cam follower surfaces to relieve the pressure of the part 43 upon a seating surface. The valve then easily may be rotated to the position of FIG. 6 in which the passage 33 of the rotatable valve member is in alignment with the inlet and outlet openings 23, 25 of the valve body.

The form of the cam elements 63, 65 is shown to enlarged scale in FIG. 8. In this figure the two vertically disposed planar surfaces 75 that are disposed in angular relation to each other and intersect along the vertical line 77 are those which engage respectively the cam follower surfaces 51 and 59, or the cam follower surfaces 53 and 61. The upper triangular surface 79 of the wedge shaped cam element of FIG. 8 and the corresponding triangular surface at the lower side of said element engage the surfaces 39, 41 of the flanges 35, 37 of the rotatable part 31 and the opposed surfaces 81, 83, at the opposite sides of the grooves 69, 71, of the recesses in which the cam elements 63 are disposed. It is found width this construction that springs or other devices for effecting movement of the part 43 away from the seating surface of the valve body are not necessary when opening rotational movement of the rotatable valve member, counterclockwise in FIGS. 6 and 7, is effected. Sufficient wedging action and, on the other hand, sufficient movement of the part 43 transversely of the flow passage 33 and of the axis of rotation are secured with a wedge shaped camming element having the angle between the surfaces 75 thereof such as that shown without risk that this camming element will become tightly wedged between the cam follower surfaces while at the same time securing tight sealing of the rotatable valve member, specifically its part 43, against the seating surface of the valve body. The angle between the surfaces 75 may be varied to suit different conditions and the frictional resistance of various materials in order to secure these desired results.

In FIG. 9 in the wall 3 of the valve body a recess or groove 91 is cut of cylindrical contour parallel to the cylindrical surface 5 of the valve body and extending along the axis of rotation. Within the recess 91 is disposed an arcuate plate 93 which, as shown may carry two pins 95 which respectively are disposed in the plate 93 so as to register with and enter the respective grooves 69 and 71 that are formed in the part 31 of the rotatable valve member. The recess 91 may be of such width and of such length along the axis of rotation as to receive in fitting relation the arcuate plate 93 so as to prevent movement of the plate either peripherally about the axis or vertically parallel to the axis, thereby to maintain the pins 95 in their proper operating positions with respect to the grooves 69, 71 for engagement with the respective cam elements 63, 65.

As shown in the drawings the plane of the surfaces 55, 57 of the part 31 is parallel both to the axis of rotation and to the axis of the flow passage 33, this plane being somewhat offset with respect to the axis of the passage. This offset in part may be brought about by the requirement for movement of the part 43 with respect to the part 31. As shown in FIG. 7, the plane of the surface 55 of the part 31 is adjacent the axis of rotation and the edge of the part 43 that is opposite to the cam element is in engagement with the surface 55. The surface 51 of the part 43 adjacent the cam element 63 is spaced from the surface 55. Thus the part 43 is given a slight pivotal movement about the far edge 97 thereof and preferably this edge 97 may be somewhat rounded, as shown in FIGS. 6 and 7. When the part 43, however, is released by movement of the cam element 63 outwardly from the axis to the position shown in FIG. 6, the surface 51 of the part 43 may be brought into the same plane as the surface 55 of the part 31. The precise position of the planes of the surfaces 51 and 53 with respect to the axis and of the surfaces 55 and 57 with respect to the axis is not critical provided these surfaces are disposed in proper relation to each other to provide for the camming action of the cam elements 63, 65 in their recesses which has been described to effect separating movement to secure sealing engagement with the seating surface and release therefrom of the part 43 concomitantly with opening movement of the valve.

It will be understood further, by utilizing cam elements in the form of wedges as shown and described above, that wear on the cam element surfaces and on the cam follower surfaces engaged thereby is automatically compensated by the cam element becoming disposed somewhat further inwardly toward the axis of rotation to maintain the engagement of these surfaces. Moreover, as the sealing surface of the valve body or the cooperating surface of the rotatable valve member wear, the movable part 43 may be moved somewhat further away from the part 31 concomitantly with the cam elements 63, 65 moving somewhat further inwardly toward the axis, so as to compensate for the wear and maintain the sealing engagement.

Within the scope of the invention other modifications may be made while providing the features of the two parts of the rotatable valve member that are supported for separating movement of one relative to the other transversely of the flow passage through the valve member and transversely of the axis of rotation thereof, this separating movement of the two parts being effected by means of a cam element, preferably of generally wedge shape, and engaged by a cam element engaging member carried by the valve body as the rotatable valve member is rotated to the position in which the valve is closed, at least one of the two parts of the rotatable valve member being brought into sealing engagement with the seating surface of the valve body. If desired both parts may be supported in the rotatable valve member so as to be movable apart from each other into engagement with the seating surface.

It will be understood further that, while the flow passage 33 is defined through the rotatable valve member by surfaces which are in part on one of the separable parts of the rotatable valve member and in part on the other, the separation of these two parts is effected when the flow of fluid is to be cut off. When the flow of the fluid is to be established by rotating the valve to the position of FIG. 6, then the two parts are not required to be in close sealing engagement with the valve body. All such modifications are intended to be within the scope of the appended claims.

I claim:

1. A valve comprising a body having a fluid inlet opening and a fluid outlet opening, a valve member having a flow passage therethrough extending between an inlet and an outlet, said valve member being supported for rotation thereof on an axis transverse to the extent of said flow passage between said inlet and said outlet thereof, said valve member in a given angular relation thereof to said body about said axis disposing said inlet and outlet of said flow passage respectively adjacent and communicating with said inlet opening and said outlet opening of said body so as to carry the fluid from said inlet opening of said body through said passage to said outlet opening, said body providing a seating surface at least one of said openings thereof, said valve member having two parts supported for movement of one relative to the other transversely of said axis of rotation of said valve member, and a cam element supported by said valve member for movement thereof transversely of said axis and relative to and between and in engagement with both of said parts, said movement of said cam element being transverse to said movement of said parts to effect said movement of said parts relative to each other transversely of said axis of rotation to seat at least a given one of said parts on said seating surface of said body and to close off flow between said inlet opening and said outlet opening when said valve member is rotated from said given angular relation to said body to another angular relation thereof to said body about said axis.

2. A valve as defined in claim 1 which comprises means supported in said valve and operatively connected to said cam element for effecting said movement of said cam element concomitantly with rotation of said valve member on said axis relative to said valve body.

3. A valve as defined in claim 1 which comprises means supported in said valve and operatively connected to said cam element for effecting said movement of said cam element to effect said seating of said given part on said seating surface of said body when said valve member is rotated to said other position in which said flow passage is transverse to the direction between said body inlet opening and said body outlet opening.

4. A valve as defined in claim 1 in which said body provides generally concentric with said axis an inner surface of revolution which includes said seating surface, said parts of said valve member providing exterior surfaces of revolution generally concentric with said axis for engagement with said inner surface of said body in fluid confining relation thereto, a given one of said parts of said valve member being disposed at one side of the plane which contains said axis of rotation and extends along said flow passage, the other part of said valve member being disposed at the other side of said plane, said parts being supported for said relative movement thereof in the direction transversely of said plane, whereby at least said given one of said parts is moved into seating engagement with said seating surface of said body upon said movement of said cam element when said valve member is in said other angular relation thereof to said body about said axis.

5. A valve as defined in claim 1 in which at least a selected one of said two parts provides a cam follower surface in angular relation to the plane which contains said axis of rotation and extends along said flow passage, said cam element being supported by said valve member for engaging said cam follower surface of said selected part in said movement of said cam element transversely of said axis and concomitantly engaging the other of said two parts so as to effect said movement of said parts relative to each other upon said movement of said cam element.

6. A valve as defined in claim 1 in which said two parts of said valve member respectively provide planar cam follower surfaces disposed in angular relation to each other and so that the line of intersection of the planes thereof is generally parallel to said axis of rotation, said cam element providing two planar surfaces disposed substantially in the same angular relation to each other as the angular relation of said planar cam follower surfaces of said two parts and respectively engaging said planar cam follower surfaces of said parts, said cam element being supported for movement thereof in the direction generally transverse to said line of intersection of said planar cam follower surfaces and between said planar cam follower surfaces and effecting movement of said two parts relative to each other transversely of said axis and of said flow passage to produce said seating engagement of at least said given one of said parts with said seating surface of said body when said valve member is in said other angular relation thereof to said body.

7. A valve as defined in claim 6 in which said seating surface of said body is a surface of revolution about said axis, at least said given part of said valve member being provided with an exterior surface of revolution for engaging said seating surface of said body, said two parts being defined by mutually adjacent planar faces generally parallel to said axis of rotation and to said extent of said flow passage, the planar cam follower surface of at least a first of said parts being disposed at an angle to the planar face of said first part, said cam element being supported for said movement thereof with respect to said valve body inwardly and outwardly toward and away from said line of intersection of said planar cam follower surfaces of said parts, and means carried by said body and engaging said cam element for effecting said inward and outward movement of said cam element concomitantly with rotation of said valve member from said given angular relation thereof to said body to said other angular relation there of to said body.

8. A valve as defined in claim 7 in which said cam element is provided with a camming surface having an extent generally about and inclined to the periphery about said axis of rotation, said means carried by said body comprising a cam element engaging member disposed for engagement with said peripheral camming surface of said cam element for effecting said inward movement of said cam element upon rotation of said valve.

9. A valve as defined in claim 8 in which said cam element engaging member is disposed so that said peripheral camming surface of said cam element is brought into engagement with said cam element engaging member as said valve member approaches said other angularly related position thereof to said body.

10. A valve as defined in claim 1 in which a main one of said two parts of said valve member is provided with a stem extending from an end thereof coaxially with said axis, means engaging said stem to support said stem and said valve member for rotation thereof on said axis, said main part being provided with guide surfaces disposed in planes perpendicular to said axis and at opposite sides of said flow passage in spaced relation along said axis, said given one of said parts being provided with guide engaging planar surfaces disposed parallel to each other and perpendicular to said axis and in engagement with said guide surfaces of said main part, said parts being provided with mutually adjacent surfaces parallel to said axis of rotation and providing for separation of said parts at said mutually adjacent surfaces upon movement of said given part relative to said main part along said parallel guide surfaces, said cam element engaging said given part to effect movement of said given part moving in engagement with said guide surfaces outwardly with respect to said axis into engagement with said seating surface of said body.

References Cited in the file of this patent
UNITED STATES PATENTS

| 170,648 | Upham | Nov. 30, 1875 |
| 239,293 | Bergreen | Mar. 22, 1881 |
| 2,277,975 | Heggem | Mar. 31, 1942 |
| 2,696,968 | Fillips | Dec. 14, 1954 |
| 2,929,607 | Clark | Mar. 22, 1960 |